T. M. LILLISTON.
BEARING FOR PEANUT PICKERS.
APPLICATION FILED JAN. 5, 1914.
1,156,910.
Patented Oct. 19, 1915.
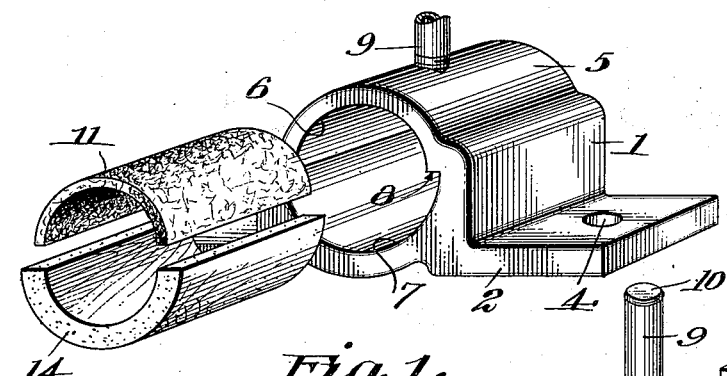
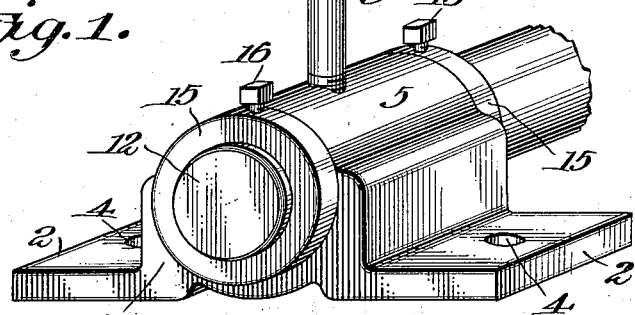
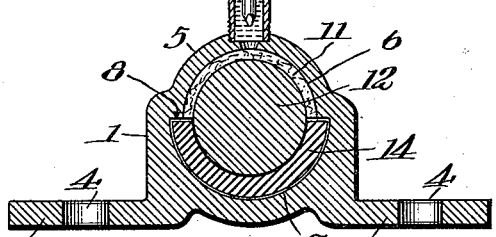
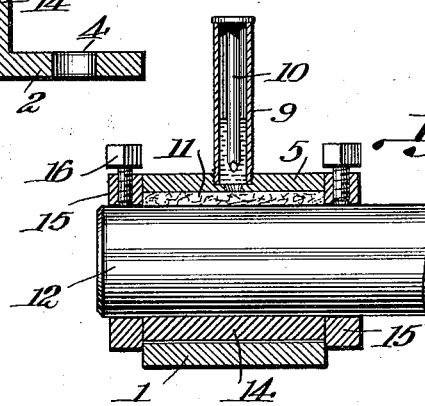
Witnesses
M. B. Nichols
H. F. Smith
Inventor
Thomas M. Lilliston
By George W. Ramsey
Attorney

UNITED STATES PATENT OFFICE.

THOMAS M. LILLISTON, OF SUFFOLK, VIRGINIA.

BEARING FOR PEANUT-PICKERS.

1,156,910.        Specification of Letters Patent.      Patented Oct. 19, 1915.

Application filed January 5, 1914. Serial No. 810,474.

*To all whom it may concern:*

Be it known that I, THOMAS M. LILLISTON, a citizen of the United States, and a resident of the city of Suffolk, in the county of Nansemond, State of Virginia, have invented certain new and useful Improvements in Bearings for Peanut-Pickers, of which the following is a specification.

This invention relates broadly to the art of bearings and more particularly to a bearing specifically designed for peanut pickers.

The principal object of this invention is to provide a bearing for a peanut picking machine and analogous devices, which bearing will not be cut and injured by the gritty sandy dust which accompanies the operation of a peanut picker.

Another object of this invention is to provide a bearing specifically adapted for peanut picking machines and analogous devices, wherein the parts are assembled in such manner as to automatically adjust themselves to wear or work conditions.

A further object of this invention is to provide a bearing for a peanut picking machine and analogous devices, wherein the fillers are loosely mounted within a fixed casing in such manner as to permit easy removal of the parts when repair is necessitated.

A still further object of this invention is to provide a bearing, for use amid grit and sand, wherein the material for the bearing is composed of a bearing block proper of a relatively soft material, and a cleaning or wiping block of a spongy material, both of said members being loosely mounted within a rigid bearing casing.

Still other and further objects of this invention will in part be obvious and will in part be pointed out in the specification hereinafter following by reference to the accompanying drawings wherein like characters represent like parts throughout the several views thereof.

Figure 1 is a detail perspective view showing the fillers for the bearing removed from the rigid casing. Fig. 2 is a perspective view showing a shaft in position in the bearing with shaft collars on the shaft. Fig. 3 is a transverse sectional elevational view taken through substantially the transverse mid plane of the bearing. Fig. 4 is a detail view showing a section of the bearing on substantially a longitudinal mid section, but showing a portion of the shaft in full.

Peanut picking machines are a type of mechanism by means of which the peanut pods are pulled from the vines to prepare the peanuts in a marketable condition. Since peanuts grow in a sandy soil and since more or less of the soil adheres to the vines and also the pods, and since the picking of the peanuts by a machine must be performed when the vines are dry, it naturally follows that while the machine is operating it is enveloped in a cloud of gritty sandy dust which covers and permeates all parts and portions of the peanut picking machine. The bearings under these conditions are very quickly cut and worn out. Attempts have been made to use hardened bearings, but such bearings have been found to be unsatisfactory and to wear little longer than the ordinary Babbitt or soft bearings.

Applicant has found by practical experiments and actual use that a bearing composed of oil soaked wood, or relatively resilient material to support the shaft, combined with a bushing of felt or soft spongy material, forms a bearing which obviates the difficulties heretofore encountered in this art. Practical experiments have shown that a particularly satisfactory bearing is formed by loosely mounting a wooden bearing block in a rigid casing and retaining the shaft on the bearing block by a layer of wool felt, above which a head of lubricating oil is maintained. The looseness, or play of the parts is sufficient to permit movement which causes dust and dirt to work outwardly due to the fact that the oil percolating through the wool felt tends to slowly flow out at the ends of the bearing. This type of bearing maintains a good bearing surface under wear and does not have the abrasive action on the shaft that a solid or metallic bearing has when run in sand or dust, because the wood forms a resilient bearing and the felt keeps the shaft wiped clean from grit.

Referring now more particularly to the drawings, the bearing comprises a rigid casing 1, preferably formed of cast iron, and provided with wing members 2, through which bolt holes 4 constitute openings in which bolts or stub screws may be inserted to fixedly mount the bearing upon the machine frame (not shown). The wing members 2 extend in opposite directions from the body 5 of the casing 1, and this portion 5 has a general cylindrical or curved exterior, and is provided on the interior with two semi-cylindrical or one-half round concave surfaces. These surfaces extend entirely across the body portion 5, and comprise the upper bore, or smaller surface 6, and the lower bore, or larger surface 7. These surfaces 6 and 7 are joined by flat surfaces 8 constituting shoulders in the body portion of the casing, as is clearly shown in Figs. 1 and 3 of the drawings. The middle upper portion of the body of the casing is tapped to receive an oil cup pipe 9. This oil cup pipe is preferably formed of a small section of iron piping having a length of six or eight inches and when filled with oil forms a mechanism for maintaining a head of oil above the bearing. This oil cup pipe is preferably capped by a wire spike 10 that is securely maintained in position due to the length and weight of a nail within the pipe. A layer of wool felt 11, forming a wiper liner, of a length sufficient to extend across the casing and of a width substantially equivalent to the perimeter of the upper bore 6, is maintained in the casing over the shaft 12, which shaft is supported on a semi-cylindrical sector or bearing liner 14 of oil soaked wood which loosely rests in the lower bore 7. The layer of felt 11 is preferably of a thickness sufficient to cause a slight pressure on the shaft 12 to securely seat the shaft against the wooden bushing 14. The shaft 12 is maintained in longitudinal position in the bearing by means of the collars 15 which are provided with set screws 16 to retain the collar in fixed position on the shaft. The collars also perform the function of retaining the layer of felt or wiping liner 11 and the oil soaked bearing liner 14 in position within the body of the casing 5.

From this construction it will be noted, particularly by referring to Fig. 3, that the oil soaked wooden liner is loosely held in position by the shoulders 8 which prevent the liner from rotating beyond certain limits, and the collars 15 which prevent the liner from escaping lengthwise from the casing. The layer of heavy felt or wiping liner 11, is maintained in position by contact with the edges of the wooden bearing liner 14 and likewise is prevented from escaping from the casing by the collars 15. It will be noted that this bearing is so constructed that the liners or wearing parts can be easily removed and replaced by merely moving the collars on the shaft and slipping the liners endwise from their position in the casing. It will be further noted that the rotation and centrifugal action of the collars 15 tends to draw the oil outwardly from the ends of the bearing and thus carry with the oil the dust, sand, etc., thereby preventing it from entering into the bearing, while the wool felt tends to collect such grit as does enter the bearing, hence keeping the shaft and the wooden bearing liner free from dirt and grit, consequently obviating the undesirable cutting and wear.

Having thus described my invention, what I desire to claim is:—

1. In a bearing for a peanut picking machine, in combination, a rigid fixed casing, said casing being provided with wing members for attaching the casing in position, said casing being also provided with a body portion having semi-cylindrical bores therein, one of said bores being larger than the other, a bearing lining of resilient material loosely mounted in said larger bore, a wiping lining of spongy material loosely mounted in the smaller bore, a shaft in said bearing between said linings, and collars on the shaft to maintain said linings within the casing.

2. In a bearing for a peanut picking machine and the like, in combination, a rigid fixed casing, said casing being provided with a body portion having semi-cylindrical bores therein, said bores having a common axis, one of said bores being larger than the other, shoulders formed within said body portion by surfaces joining said bores, a bearing liner seated in the larger bore and being of a thickness greater than the depth of said shoulders and projecting inwardly beyond the shoulders, a wiping liner of spongy material seated in the smaller bore and having the edges thereof engageable with the projecting portions of the bearing liner to prevent said wiping liner from being displaced by rotation, a shaft seated on said bearing liner and beneath said wiping liner, and collars slidably mounted upon said shaft.

3. In a bearing for peanut picking machines and the like, in combination, a rigid fixed casing, said casing being provided with two semi-cylindrical bores diametrically disposed on opposite sides of a common axis, one of said bores being formed on a curve having a larger radius than the other, a bearing liner loosely mounted in the larger bore, a wiping liner loosely mounted in the smaller bore, a shaft mounted to rotate between said liners, and means carried by said shaft to retain said liners within said casing.

4. In a device of the class described in combination, a rigid casing having a transverse opening to form seats for bearing liners, a bearing liner loosely mounted in said casing and slidable longitudinally therein, a wiping liner loosely mounted in said casing above said bearing liner, said wiping liner being also slidable longitudinally within said casing, a shaft adapted to rotate between said liners, and means to prevent excessive longitudinal movement of said liners.

5. In a bearing of the class described, a rigid casing having an opening therein, a wooden bearing liner seated in said opening and loosely mounted therein, a shaft rotatable on said wooden bearing liner, a wiping liner above said wooden bearing liner and exerting pressure upon said shaft to seat said shaft against the wooden bearing liner, and means for retaining said liners within said casing.

6. In a device of the class described in combination, an integral rigid casing having a transverse opening therein, a bearing liner loosely mounted in said opening in said casing and capable of sliding longitudinally therein, a wiping liner of wool felt mounted above said wooden bearing liner, said wiping liner also being loosely mounted within the opening in said casing, a shaft adapted to rotate between said liners, and means for maintaining a head of oil above said wiping liner to cause said oil to flow outwardly from the upper middle portion of said bearing toward the ends thereof, substantially as described.

7. In a bearing of the class described, an integral rigid casing having an opening therein, shoulders formed within said opening, a wooden bearing liner loosely mounted in said opening beneath said shoulders, a wool felt wiper loosely mounted in said opening above said wooden bearing liner, and a shaft adapted to rotate between said liners, substantially as described.

THOMAS M. LILLISTON.

Witnesses:
L. P. HILL,
G. A. HARRIS.

Copies of this patent may be obtained for five cents each, by addressing the "Commissioner of Patents, Washington, D. C."